United States Patent
Zhang et al.

(10) Patent No.: US 7,899,110 B1
(45) Date of Patent: Mar. 1, 2011

(54) BIT SYNC FOR RECEIVER WITH MULTIPLE ANTENNAS

(75) Inventors: Hongyuan Zhang, Sunnyvale, CA (US); Zhiyu Yang, Cupertino, CA (US)

(73) Assignee: Marvell International Ltd., Hamilton (BM)

( * ) Notice: Subject to any disclaimer, the term of this patent is extended or adjusted under 35 U.S.C. 154(b) by 702 days.

(21) Appl. No.: 11/957,245

(22) Filed: Dec. 14, 2007

Related U.S. Application Data (60) Provisional application No. 60/882,059, filed on Dec. 27, 2006.

(51) Int. Cl.
 H04B 1/00 (2006.01)
 H04L 27/06 (2006.01)
(52) U.S. Cl. .......................................... 375/150; 375/343
(58) Field of Classification Search .................. 375/147, 375/149–150, 316, 340, 342–343, 349–350; 455/132–133, 137; 370/503, 509, 514
See application file for complete search history.

(56) References Cited

U.S. PATENT DOCUMENTS

| | | | | |
|---|---|---|---|---|
| 6,058,138 A * | 5/2000 | Fukumasa et al. | ............ | 375/130 |
| 6,188,682 B1 * | 2/2001 | Takagi et al. | .................. | 370/342 |
| 6,333,934 B1 * | 12/2001 | Miura | ........................... | 370/441 |
| 7,161,996 B1 * | 1/2007 | Steele et al. | .................. | 375/347 |
| 2001/0014114 A1 * | 8/2001 | Baltersee et al. | ............. | 375/148 |
| 2004/0096017 A1 * | 5/2004 | Holt et al. | ...................... | 375/343 |
| 2005/0042997 A1 * | 2/2005 | Steele et al. | .................. | 455/295 |
| 2007/0248199 A1 * | 10/2007 | Steele et al. | .................. | 375/347 |
| 2008/0002797 A1 * | 1/2008 | Raman et al. | ................. | 375/355 |

* cited by examiner

*Primary Examiner* — Khanh C Tran (57) ABSTRACT

A receiver with multiple antennas, such as an 802.11b receiver may generate a magnitude signal for each antenna and add the results to determine a peak signal point in a received frame to provide a bit synchronization signal to a rake receiver component. The receiver may include one or more threshold switches that only pass individual or combined magnitude signals when the magnitude signals are above a certain level. The received frame may be dividing into segments using a switching circuit and registers. A comparator may then evaluate the registers to determine the segment with the highest magnitude signal. In one embodiment, values for adjacent segments may be added to a current segment when determining the segment with the highest magnitude signal.

25 Claims, 11 Drawing Sheets

BIT SYNC FOR RECEIVER WITH MULTIPLE ANTENNAS

CROSS-REFERENCE TO RELATED APPLICATION

This application claims the benefit of U.S. Provisional Application No. 60/882,059, entitled "BIT SYNC FOR 802.11b RECEIVER WITH MULTIPLE ANTENNAS," filed on Dec. 27, 2006, which is hereby incorporated by reference herein.

DESCRIPTION OF RELATED ART

Direct Sequence Spread Spectrum (DSSS) is a modulation scheme found in many common wireless communication systems, such as the U.S. global positioning system (GPS), code division multi-access (CDMA) cellular telephones, and many wireless local area networks, such as 802.11(b) or WiFi.

Resistance to multi-path signal interference in such systems is provided by implementation of a rake receiver having multiple receiver taps providing time-delayed outputs. The time-delayed outputs of the rake receiver can be combined to add the energy from the various multi-path signals. Selecting a center point for the rake receiver time delay often relies on selecting a point in the receive frame with the strongest signal. To accomplish that, a receiver may divide the frame into multiple segments and select the point in the frame with the strongest signal for bit synchronization.

In a typical diversity antenna environment, the receive path with the strongest signal is selected.

SUMMARY OF THE DISCLOSURE

In a diversity antenna environment where multi-path signals are found in each receive path, selecting one channel to provide bit synchronization timing to a rake receiver may result in sub-optimal performance. To refine the timing of bit synchronization, each radio frequency (RF) front-end in a diversity receiver supplies its output to a bit synchronization circuit. The bit synchronization circuit sums the diversity receiver outputs and uses the results to set the timing of bit synchronization. In alternate embodiments, the diversity receiver outputs can be ignored or set to zero when their signal level, either separately or combined, does not reach a threshold level, for example.

In embodiments with a one microsecond frame period, a 22 megahertz sampling rate may produce 22 samples of a single frame and the sample with the highest signal strength may be selected. The location of the selected sample among the 22 samples may then be used to set the center of the rake filter timing, i.e. the bit synchronization time.

In one embodiment, the value of adjacent samples are added to an individual sample before determining the sample with highest signal strength. For example, 7 samples before and 7 samples after a current sample may be added to the current sample before a comparison of sample values is made.

DETAILED DESCRIPTION

Figure 1:
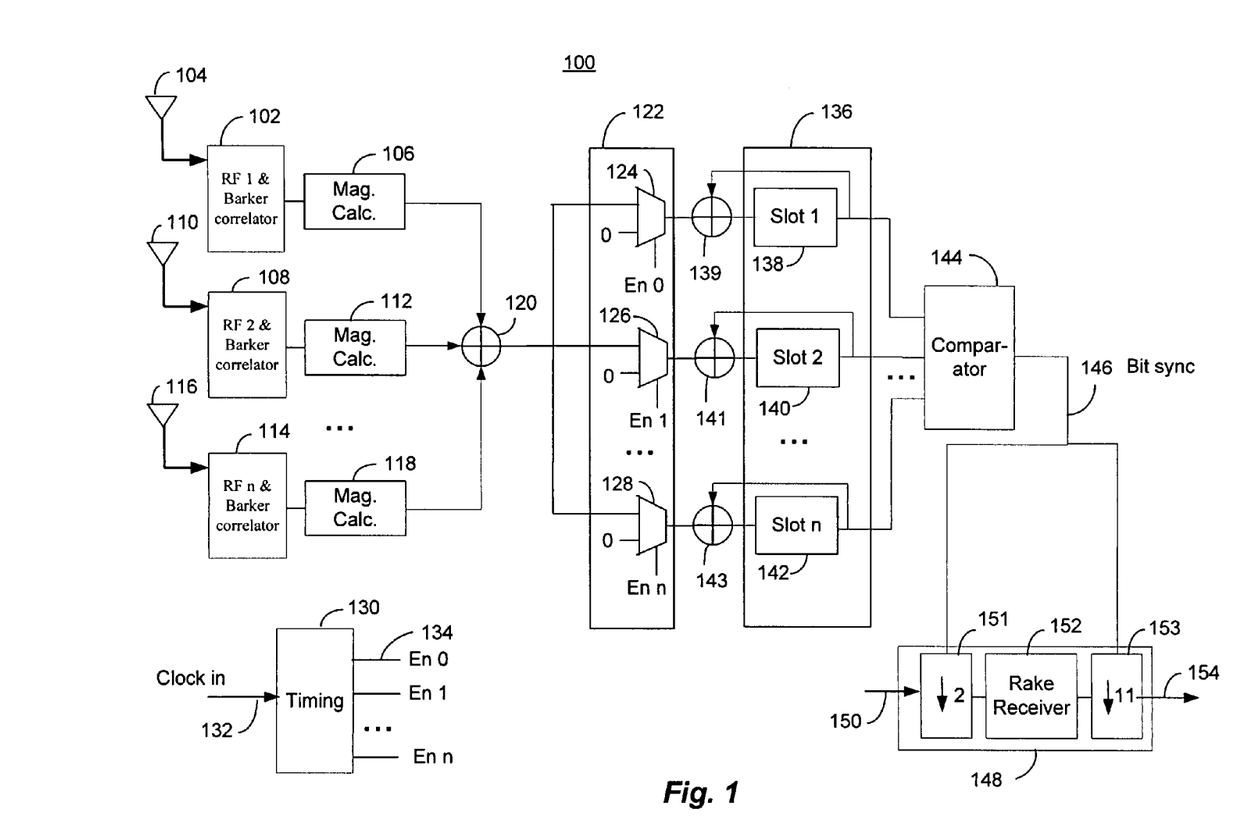
FIG. 1 is a block diagram of a bit synchronization circuit for a receiver with multiple antennas.

FIG. 1 is a block diagram of an example receiver 100 incorporating bit synchronization for a multiple antenna configuration receiver. A first radio frequency (RF) section and correlator 102 may be coupled to a first antenna 104. In the case of an 802.11(b) network, the correlator 102 may be a Barker code correlator. The output of the first RF section and correlator 102 may be coupled to a magnitude calculator 106.

A second RF section and correlator 108 may be coupled to a second antenna 110. The output of the second RF section and correlator 108 may be coupled to a second magnitude comparator 112.

In some embodiments, the two RF sections and correlators 102 and 108 may provide the desired diversity. In other embodiments, one or more additional RF sections may be present, represented by a third RF section and correlator 114. A third antenna 116 may feed the third RF section and correlator 114, which, in turn, may be coupled to a third magnitude calculator 118.

The magnitude calculators 106, 112, and 118 are discussed in more detail below with respect to FIG. 4. The output of each magnitude calculator 106, 112, 118 may be added at a summing circuit 120. The summing circuit 120 may provide a sum output of the signals appearing at inputs of the summing circuit 120.

A switching circuit 122 may incorporate a plurality of switches, multiplexers, etc., that couple the sum output of the summing circuit 120 to a register circuit 136. The switching circuit 122 is shown with a plurality of multiplexers 124, 126, and 128. Each multiplexer 124, 126, 128 may selectively couple either the sum output or a zero value to its output, depending on the state of the multiplexer's respective enable input. A timing circuit 130 may take a clock input 132 and successively activate each of its outputs 134. Each of the separate outputs 134 of the timing circuit 130 may be coupled to an enable input of the respective switch/multiplexer 124, 126, and 128.

The register circuit 136 may have a plurality of locations or slots 138, 140, 142. In one embodiment, the register circuit 136 may be a memory with designated addressable locations for storing sum output data. In another embodiment, the register circuit 136 may include a plurality of separate registers 138, 140, 142.

Each slot 138, 140, 142 may be coupled to a comparator 144. The comparator 144 is used to compare the values of each slot to determine which slot has the highest value, i.e. the strongest signal. The comparator 144 may be activated after the last slot has been loaded with a value. Alternatively, the output of a slot, e.g. slot 138, may be fed back to an adder 139 to allow averaging the value of each slot 138, 140, 142 over two or more symbol times. Corresponding adders 141 and 143 may operate with representative slots 140 and 142.

The number of slots 138, 140, 142 may be based on the length of the correlation code to be used. For example, if a Barker code of length eleven is used, the register circuit 136 may include eleven slots 138, 140, 142 or some multiple of eleven (if oversampling is utilized, for example). In one specific embodiment that may be utilized in an IEEE 802.11b environment, there may be 22 slots (corresponding to a length-11 barker code with 2-times oversampling) and the timing circuit 130 may operate at an approximately 45 nanosecond rate, so that a symbol time of 1 microsecond is divided into 22 time slots. The comparator 144 may become active at the end of the $22^{nd}$ slot time and a bit sync output 146 represents the location in the 1 microsecond period corresponding to the slot with the highest correlation value. If adders 139, 141, and 143 are utilized for averaging slot values over multiple symbol times, the comparator 144 may be activated after the last sample is taken for the final symbol time of the averaging process.

The bit sync output 146 may be coupled to a rake receiver system 148. The rake receiver system 148 may have a plurality of inputs 150 coupled to the outputs of the barker code correlators 102, 108, 114 and an output 154. In one embodiment, the rake receiver may have a single input 150 coupled to a selected Barker correlator. The bit sync output 146 may be used by the rake receiver system 148 to center its rake fingers. For example, the bit sync output 146 may be coupled to a 2× downsampler 151 and an 11× downsampler 153, placed at the input and output, respectively, of a rake receiver 152.

In operation, each representative antennae 104, 110, and 116 may forward RF energy to a respective RF section and Barker correlator 102, 108, 114. The output of each RF section and Barker correlator 102, 108, 114 may be processed by magnitude calculators 106, 112, 118. The magnitude calculators 106, 112, 118 account for contributions of real and imaginary portions of each incoming signal.

The output of the individual magnitude comparators 106, 112, 118 may be added at a summing circuit 120 and the sum output made available to the switching circuit 122. A timing circuit 130 may generate enable signals to activate switches 124, 126 and 128, in sequence, during a symbol duration to allow sum output signal data to be passed to corresponding slots 138, 140, 142. If implemented, the process may continue over several symbol times to create a cumulative value for each slot 138, 140, 142.

As the sum output signal data is loaded into the last slot 142, the comparator 144 may be activated to determine which slot contains the highest signal level. The comparator 144 may send a bit sync signal 146 that corresponds to the point in the frame with the highest value to the rake receiver 148. If more than one symbol time's worth of data is accumulated, the comparator 144 may be activated after the last symbol of the average is received at the final slot, for example, slot 142.

Figure 2:
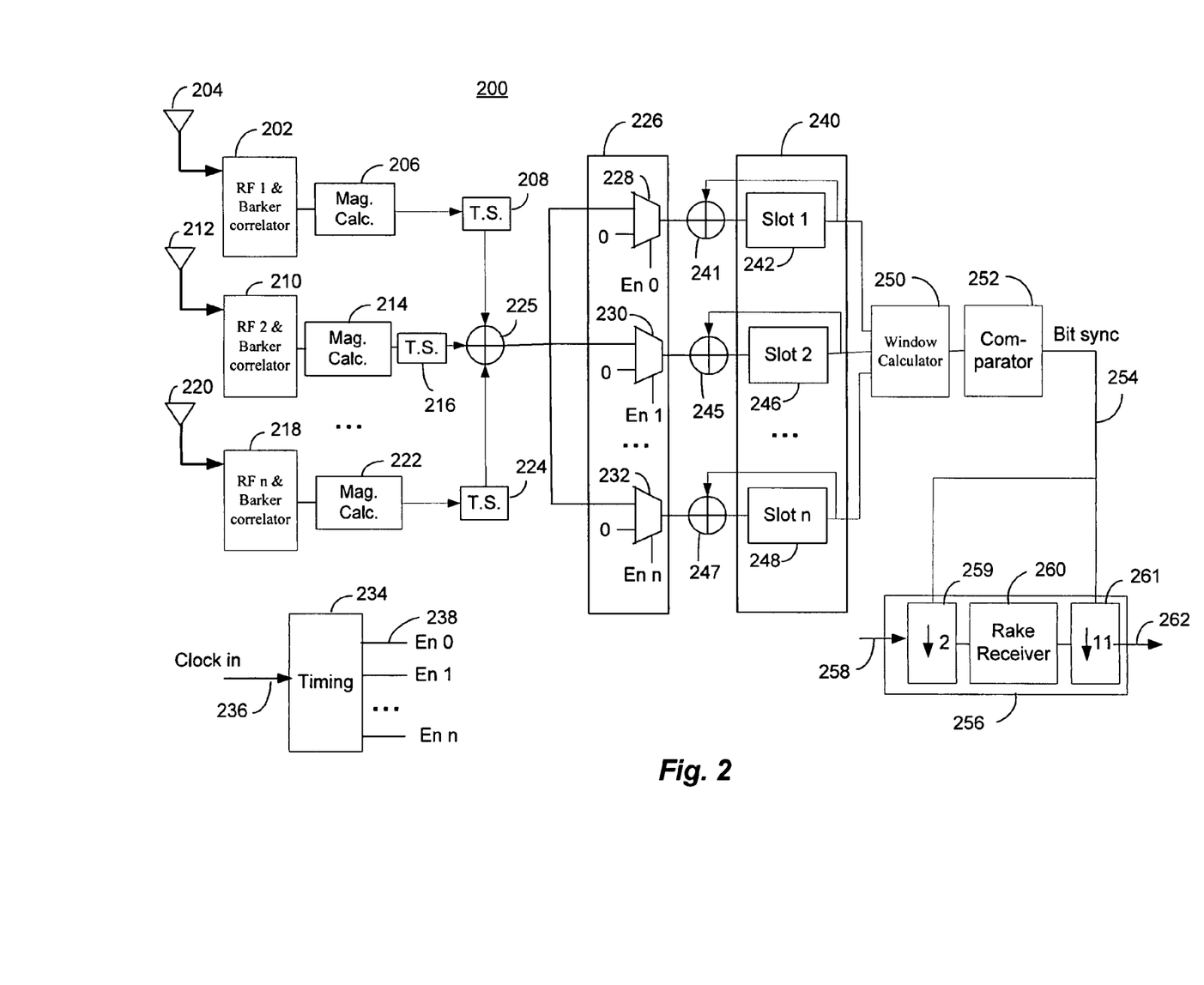
FIG. 2 is a block diagram of an alternate embodiment of a bit synchronization circuit for a receiver with multiple antennas.

FIG. 2 illustrates an alternate embodiment of a receiver 200 illustrating bit synchronization for a multiple antenna system. The receiver 200 may have a number of antennas 204, 212, and 220 coupled to respective RF sections and Barker correlators 202, 210, 218. Each of the RF and Barker correlators 202, 210, 218 may be connected to respective magnitude calculators 206, 214, and 222. Rather than being coupled directly to the summing circuit 225, the magnitude calculators 206, 214, and 222 may be coupled to respective threshold switches 208, 216, and 224.

Each of the threshold switches 208, 216, and 224 may be set to transmit a signal only when the signal reaches a minimum level. Therefore, the sum output values passed through the switching circuit 226 to the register 240 may have a greater dynamic range than if raw signals were summed and passed.

As with the circuit of FIG. 1, the switching circuit 226 may have switch/multiplexers 228, 230, and 232 controlled in sequence by timing circuit 234. The timing circuit 234 may have a clock input 236 and outputs 238 that sequentially enables switch/multiplexers 228, 230, 232. The register 240 may have slots 242, 246 and 248 that store the data passed by the switching circuit 226. To allow calculation of a bit synchronization signal over several symbol times, adders 241, 245, and 247 may be coupled to their respective slots 242, 246, and 248. As, described above, successive symbol data may be added to each slot 242, 246, and 248 over the desired number of symbol times.

A window calculator 250 may be used to combine the signal values stored in adjacent slots of register 240. In one embodiment, the register 240 may have 22 slots and the window calculator 250 may add register values in a pattern such as ±three slot pattern or ±seven slot pattern.

For example, a ±3 pattern may calculate a value for slot 4 may be the sum of the values of slots 1-7. A value for slot 5 may be the sum of values of slots 2-8. In a ±seven slot pattern, a value for slot 11 may be the sum of slots 4-18, while a value of slot 14 may be the sum of slots 7-21. Multiple effects now act to emphasize a point in the receive frame, the culling of weak signals at the threshold switches 208, 216 and 224, the summing of those signals passing the threshold switches 208, 216, 224 at the summing circuit 225, and the window calculation using adjacent values all tend to produce a more pronounced peak value for the comparator 252 to use to produce the bit synchronization signal 254.

The bit synchronization signal 254 may be coupled to a rake receiver system 256. The rake receiver system 256 may have a plurality of inputs 258 coupled to the outputs of the barker code correlators 202, 210, 218 and an output 262. In one embodiment, the rake receiver system 256 may have a single input 258 coupled to a selected Barker correlator, e.g. the RF and Barker correlator 202, 210, 218 with the strongest signal. The bit sync output 254 may be used by the rake receiver system 256 to center its rake fingers. For example, the bit sync output 254 may be coupled to a 2× downsampler 259 and an 11× downsampler 261, placed at the input and output, respectively, of a rake receiver 152. When other sampling plans are used, the downsampler scale may be different.

Figure 3:
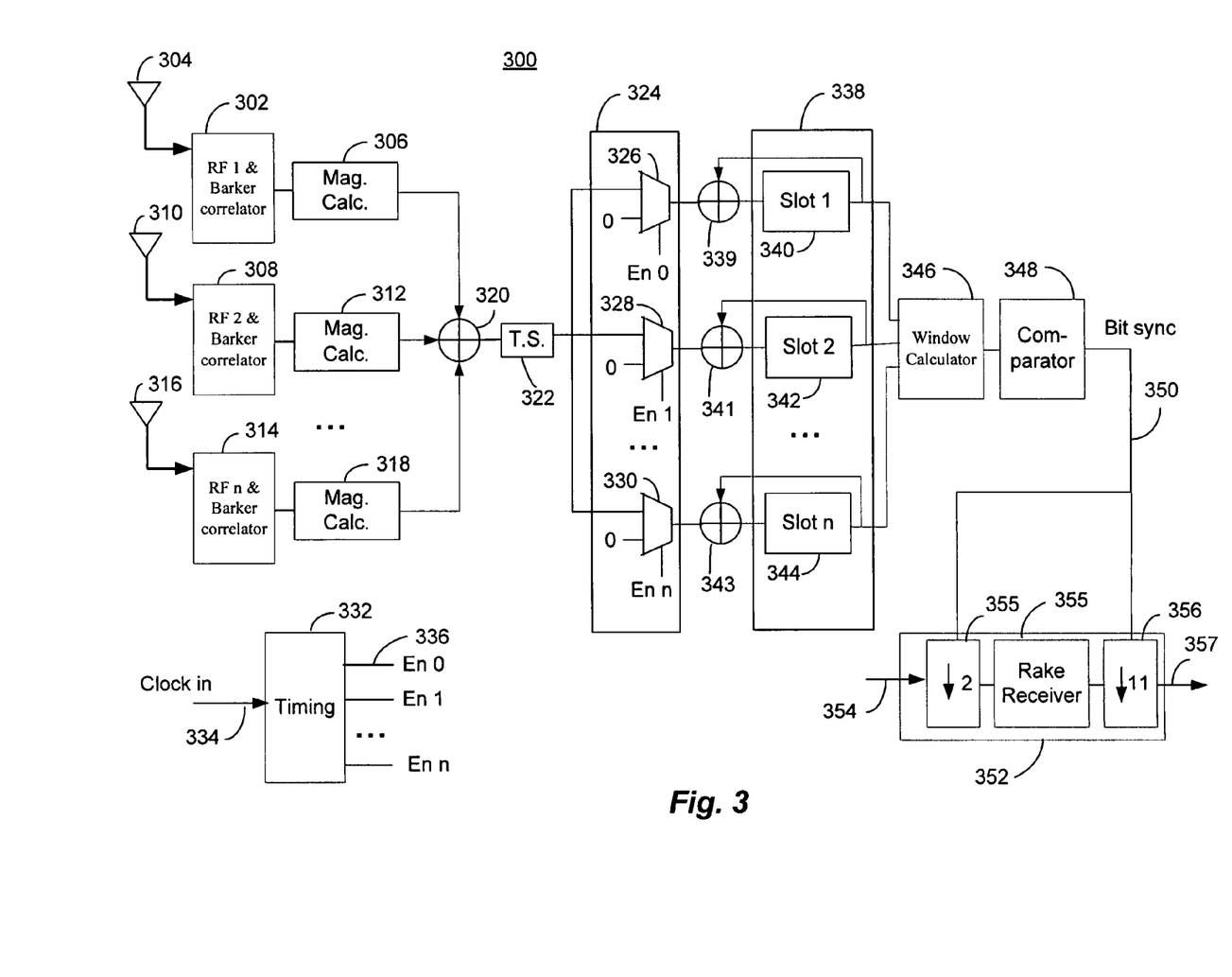
FIG. 3 is a block diagram of yet another embodiment of a bit synchronization circuit for a receiver with multiple antennas.

FIG. 3 illustrates another embodiment of a receiver 300 having a similar architecture to that of the receiver 200 of FIG. 2. A front-end portion includes antennas 304, 310, and 316; RF sections and Barker correlators 302, 308, 314; and magnitude comparators 306, 312, and 318. A summing circuit 320 receives and combines output signals from the various Barker correlators 306, 312, 318. The difference between the receiver 200 of FIG. 2, and the receiver 300 of FIG. 3 is illustrated by the location of a single threshold switch 322 at the output of the summing circuit 320 rather than the three exemplary threshold switches 208, 216, 224 at the inputs of the summing circuit 225 of FIG. 2. In this embodiment, the threshold switch 322 operates on the sum output signal of the summing circuit 320 rather than the individual outputs of the magnitude calculators 306, 312, 318.

The switching circuit 324, with its individual switch/multiplexers 326, 328, 330 operates in a similar manner as those described in previous figures under the control of timing circuit 332 with its input 334 and outputs 336. The outputs of the switching circuit 324 may be passed to register 338 with its individual slots 340, 342, and 344.

To allow calculation of a bit synchronization signal over several symbol times, adders 339, 341, and 343 may be coupled to their respective slots 340, 342, and 344. As, described above, successive symbol data may be added to each slot 340, 342, and 344 over the desired number of symbol times.

Similar to the receiver 200 depicted in FIG. 2, the receiver 300 may have a window calculator 346 to calculate a value for an individual slot of the register 338 by combining the values from adjacent cells using a predetermined pattern. The comparator 348 may then use the results of the combinations to determine a bit sync time 350 used by a rake receiver system 352.

The rake receiver system 352 may have a plurality of inputs 354 coupled to the outputs of the Barker code correlators 302, 308, 314 and an output 357. In one embodiment, the rake receiver system 352 may have a single input 354 coupled to a selected Barker correlator, e.g. the RF and Barker correlator 302, 308, 314 with the strongest signal. The bit sync output 350 may be used by the rake receiver system 352 to center its rake fingers. For example, the bit sync output 350 may be coupled to a 2× downsampler 355 and an 11× downsampler 356, placed at the input and output, respectively, of a rake receiver 355. When other sampling plans are used, the downsampler scale may be different.

Figure 4:
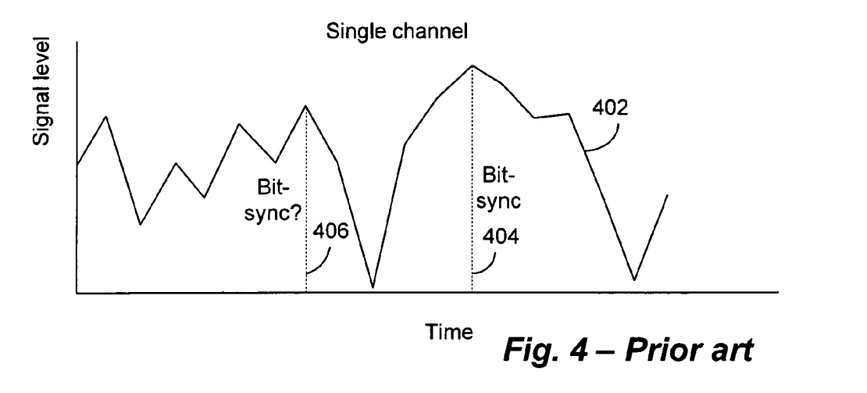
FIG. 4 is a representation of a prior art waveform used for bit synchronization.

FIG. 4 illustrates a prior art waveform 402 representing a frame output of a single antenna RF section and Barker correlator and magnitude calculator, such as elements 102 and 106 of FIG. 1. The peak signal occurs at point 404, but an alternate peak at point 406 could easily be interpreted as a peak in presence of noise.

Figure 5:
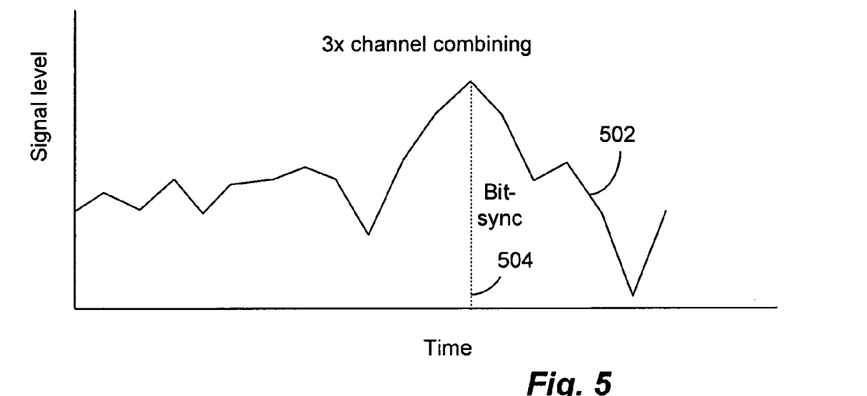
FIG. 5 is a representation of a waveform used for bit synchronization in a receiver with multiple antennas.

FIG. 5 illustrates a waveform 502 representing a frame output of a multiple antenna front end as may be found at the output of the summing circuit 120 of FIG. 1. The waveform 502 has a peak at point 504 that is more discernible as a result of the combination of signals captured at diversity antennas, such as antennas 104, 110, and 116.

Figure 6:
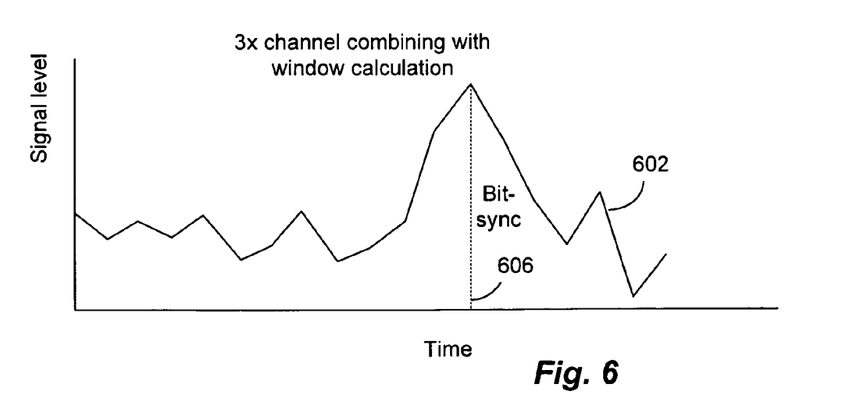
FIG. 6 is another representation of a waveform used for bit synchronization in a receiver with multiple antennas.

FIG. 6 illustrates a waveform 602 representing a frame output of a multiple antenna front end as may be found at the output of the summing circuit 225 of FIG. 2 or the output of the threshold switch 322 of FIG. 3. The waveform 602 has a pronounced peak at point 604 that shows the effect of threshold switching and using a window calculator 250 or 346 to reduce the effects of noise.

Figure 7:
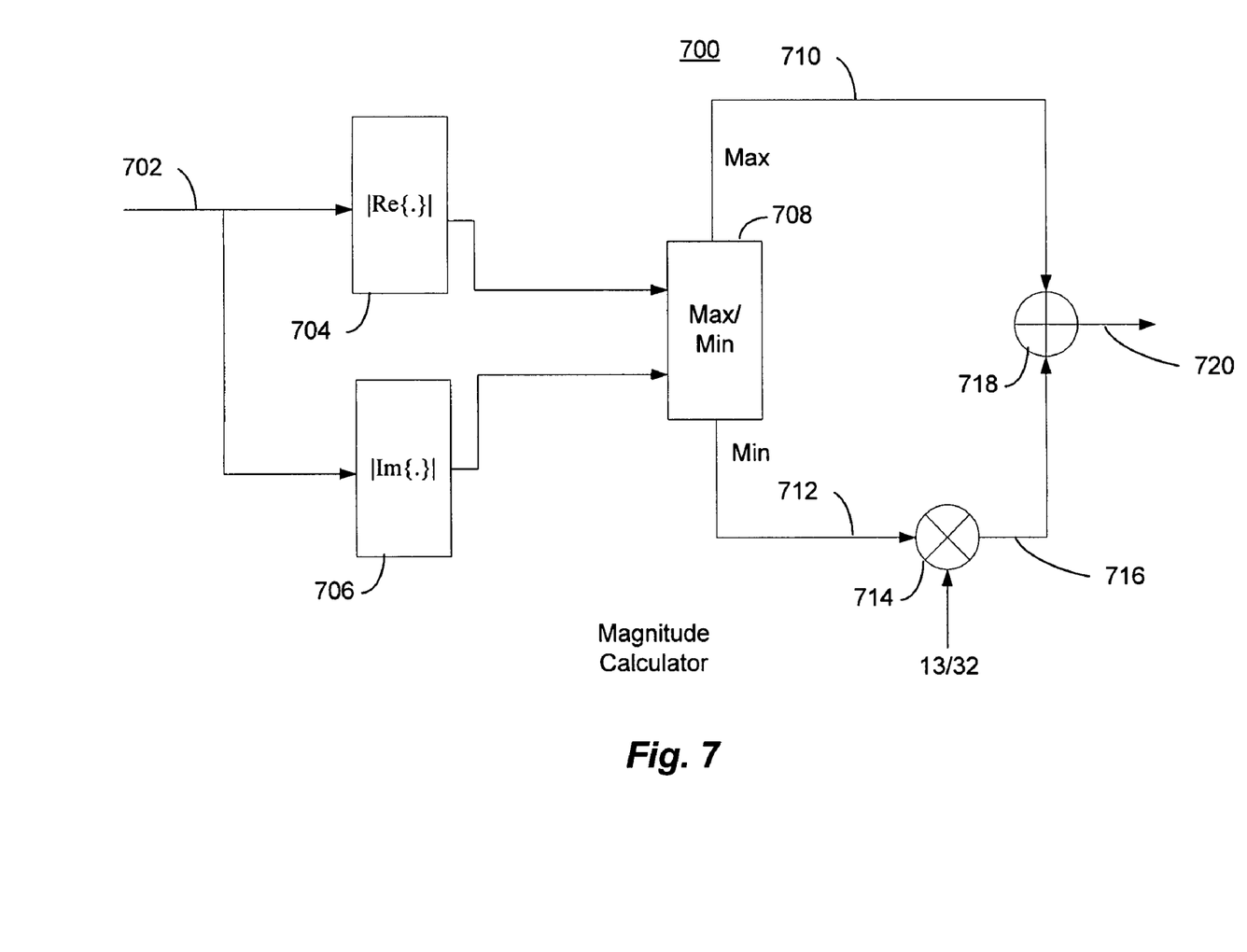
FIG. 7 is a block diagram of a magnitude calculator that may be used in a bit synchronization circuit for a receiver with multiple antennas.

FIG. 7 illustrates an exemplary magnitude calculator 700, similar to magnitude calculator 106 of FIG. 1, et al. the magnitude calculator 700 may take an input signal 702 and process it at real and imaginary magnitude blocks 704 and 706, respectively. The respective outputs of the real 704 and imaginary 706 blocks may be fed to a maximum/minimum block 708. The maximum/minimum block 708 may take the larger of the two input signals and output it over connection 710 while the smaller of the two input signals may be output over connection 712. The minimum output on connection 712 may be fed to a multiplier 714 where the signal is multiplied by the constant 13/32 to account for a base noise floor, as shown in the derivation following. The output of the multiplier 714 may be coupled over connection 716 to a summing circuit 718 where the signals on connections 716 and 710 are added and the output presented on connection 720.

If the received signal in the i-th receive chain is represented as $r_i = h_i s + n_i$, where h, is the channel coefficient, s is the data symbol with unit power, $n_i$ is the noise, and $|Re(h_i)|=x_i$, $|Im(h_i)|=y_i$ $|Re=n_{xi}|Im(n_i)|=n_{yi}$ The instantaneous signal to noise ratio (SNR) for a given single channel is given by:

$$SNR_i = \frac{(\alpha_i x_i + \beta_i y_i)^2}{E[(\alpha_i n_{xi} + \beta_i n_{yi})^2]} \approx \frac{(\alpha_i x_i + \beta_i y_i)^2}{0.856 N_0},$$

$$i = 0, 1, 2 \; \alpha_i, \beta_i = 1 \text{ or } 13/32$$

Therefore, in FIG. 7, the minimum signal, being more likely to have a high noise influence, is multiplied by 13/32 before summing with the maximum signal at the summing circuit 718.

For a 3 antenna diversity receiver with magnitude combining:

$$SNR = \frac{(\alpha_0 x_0 + \beta_0 y_o + \alpha_1 x_1 + \beta_1 y_1 + \alpha_2 x_2 + \beta_2 y_2)^2}{E[(\alpha_0 n_{x0} + \beta_0 n_{y0} + \alpha_1 n_{x1} + \beta_1 n_{y1} + \alpha_2 n_{x2} + \beta_2 n_{y2})^2]} \approx$$

$$\frac{[(\alpha_0 x_0 + \beta_0 y_0)^2 + (\alpha_1 x_1 + \beta_1 y_1)^2 + (\alpha_2 x_2 + \beta_2 y_2)^2 + 2(\alpha_0 x_0 + \beta_0 y_0)(\alpha_1 x_1 + \beta_1 y_1)]}{3.31 N_0} +$$

$$\frac{[2(\alpha_0 x_0 + \beta_0 y_0)(\alpha_2 x_2 + \beta_2 y_2) + 2(\alpha_1 x_1 + \beta_1 y_1)(\alpha_2 x_2 + \beta_2 y_2)]}{3.31 N_0}$$

For example, in an additive white Gaussian noise model (AWGN)=1, $y_i$=0, the SNR gain is about 3-4 dB. This SNR gain also enables improved performance in channel fading conditions.

Figure 8:
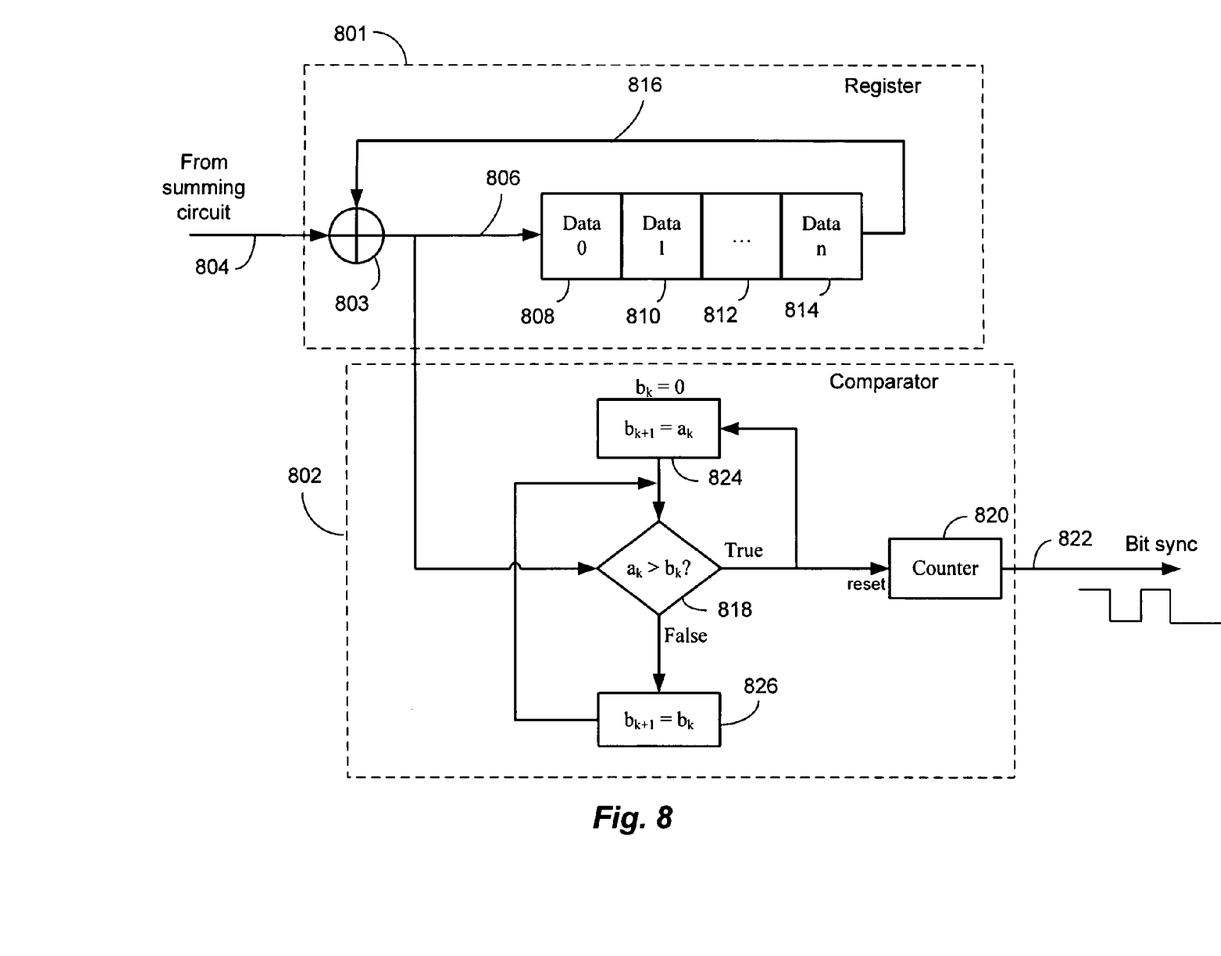
FIG. 8 is a block diagram of an alternate embodiment of the register and comparator of FIG. 1.

FIG. 8 illustrates an alternate embodiment of a register circuit, such as register circuit 136 of FIG. 1. Register 801 and comparator 802 allow multiple frames to be combined to determine a bit-sync signal, similar in function, but architecturally different from register 136 and comparator 144 of FIG. 1.

The register 801 includes an adder 803 that accepts an input signal on connection 804 from a summing circuit, such as summing circuit 120 of FIG. 1. Initially, the input signal on connection 804 is added to a zero value and clocked into data slot 808. As subsequent data is clocked to successive data slots 810, 812, and 814, data from the subsequent frame will begin to push data out of the last slot 814 and back to the adder 803 over connection 816. The earliest data from the initial frame will be combined with the earliest data from a current frame.

As the output from the adder 803 appears on connection 806, it may also be routed to the comparator 802 as value $a_k$. The comparator 818 may start with an initial condition $b_k$=0, and the value of $a_k$ will, in most cases be larger than $b_k$. The comparator "true" output will go high when $a_k > b_k$. Since the output of the comparator is coupled to the reset input of the counter 820, the counter output 822 will pulse whenever $a_k > b_k$. The counter output 822 is the bit sync line. The next value of b, $b_k$+1 is set to the value of $a_k$ at block 824 and renamed $b_k$.

For the sake of illustration, the next value of $a_k$ is assumed to be smaller than $b_k$. The comparator 818 'false' line will go high and activate block 826 where $b_k$+1 is set to $b_k$ and used as the next comparison value. The 'true' output will go low and cause the counter 820 to stop counting, leaving the output 822 low. Whenever a new high value of $a_k$ is reached, the 'true' output of the comparator 818 will go high and the counter 820 will output at least one pulse. When the peak value of $a_k$ is reached, all successive samples will be smaller than $b_k$ and the 'true' output of the comparator 818 will no longer go high. Thus, the final pulse on the output 822 will correspond in time with the peak value of the signal, $a_k$. In one embodiment, the counter 820 may run at a 22 MHz rate, with a frame time of 1 microsecond and 22 slots in the register 801. A time base (not depicted), such as the clock in signal 132 of FIG. 1 may be used by both the counter 820 and the register 801.

Figure 9:
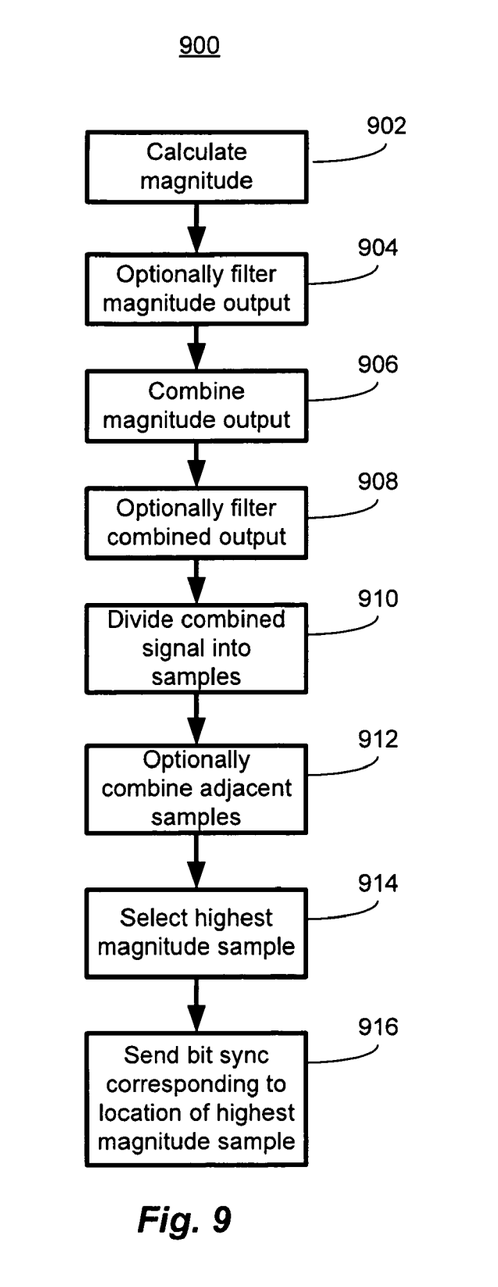
FIG. 9 is a method of generating a bit synchronization signal for a receiver with multiple antennas.

FIG. 9 is a method 900 of performing bit synchronization in a spread spectrum receiver having more than one receive path. Each receive path may include an antenna, an RF section and a correlator, for example, elements 104 and 102 of FIG. 1, respectively. The receive path may also include a magnitude calculator 106 that combines real and imaginary portions of a received signal.

At block 902, the magnitude calculator 106 take the output of the correlator 102 and calculate its own output to be the greater absolute value of a real and an imaginary signal components added to the lesser of the absolute magnitude of the real and the imaginary components multiplied by 13/32 (to account for noise is the lower signal channel). This calculation may be repeated for each receive path present in the receiver.

Optionally, at block 904, a threshold switch 208, 216, 224 in each receive path may be used to remove signals that are below a threshold level. The threshold switch 208, 216, 224 may operate in real time, that is, whenever the signal at the input of the threshold switch 208, 216, 224 is above the threshold level, the signal is passed through. Whenever the signal is below the threshold level, the signal is blocked.

At block 906, whether filtered or not, the output from the magnitude calculator 206, 214, 222 of each receive path may be added together to form a combined signal at a summing circuit, such as summing circuit 225 of FIG. 2. In cases where threshold filtering is used, the combined signal may only be the sum of each magnitude calculator output which exceeds a threshold level, with the other outputs set to zero.

Optionally, at block 908, a threshold switch, such as threshold switch 322 may filter the output of the summing circuit. The threshold switch 322 may block the combined signal of the summing circuit 320 and, in one embodiment, may output a zero when the combined signal is below the threshold level. As above, the threshold switch 322 may operate in real time, reflecting instantaneous changes at its input.

At block 910, the combined signal may be divided into a plurality of samples at a sequence of intervals over a receive frame time. In one embodiment, each of the plurality of samples may be stored in separate locations in a register 338, such as slots 340, 342, and 344.

Optionally, at block 912, individual sample values may be combined with one or more adjacent interval sample values. Because the samples are in the time domain, the combining of sample values from adjacent intervals creates a time-averaged value that can be useful in reducing the effects of noise. In one embodiment, three samples on each side of a current sample may be combined. In another embodiment, in a register with 22 samples, seven samples on each side of a current sample may be combined when calculating a final value for the current sample.

At block 914, whether combined with adjacent samples or not, the sample with the highest magnitude value for the frame time may be selected. Because each sample represents a time interval, the sample with the highest magnitude value also corresponds to a time interval within the frame.

At block 916, a bit-synchronization signal may be provided to a rake receiver where the bit-synchronization signal corresponds to the sample with the highest magnitude value and therefore also corresponds to the time interval in the frame where the highest magnitude value occurs.

FIGS. 10A-10F, illustrate various devices in which bit synchronization for multiple antenna receivers, such as described above, may be employed.

Figure 10A:
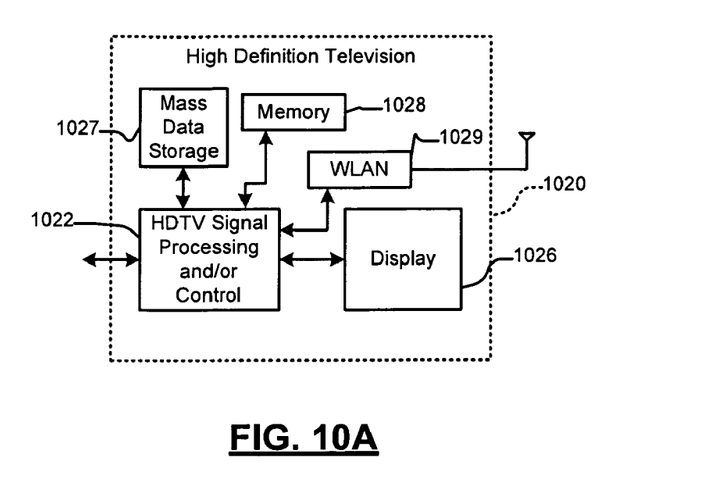
FIGS. 10A-10F illustrate embodiments of circuits that may incorporate a receiver with multiple antennas.

Referring now to FIG. 10A, such techniques may be utilized in a high definition television (HDTV) 1020. HDTV 1020 includes a mass data storage 1027, an HDTV signal processing and control block 1022, a WLAN interface and memory 1028. HDTV 1020 receives HDTV input signals in either a wired or wireless format and generates HDTV output signals for a display 1026. In some implementations, signal processing circuit and/or control circuit 1022 and/or other circuits (not shown) of HDTV 1020 may process data, perform coding and/or encryption, perform calculations, format data and/or perform any other type of HDTV processing that may be required.

HDTV 1020 may communicate with a mass data storage 1027 that stores data in a nonvolatile manner such as optical and/or magnetic storage devices. The mass storage device may be a mini HDD that includes one or more platters having a diameter that is smaller than approximately 1.8". HDTV 1020 may be connected to memory 1028 such as RAM, ROM, low latency nonvolatile memory such as flash memory and/or other suitable electronic data storage. HDTV 1020 also may support connections with a WLAN via a WLAN network interface 1029. The WLAN network interface 1029 may implement bit-synchronization for multiple antenna receivers.

Figure 10B:
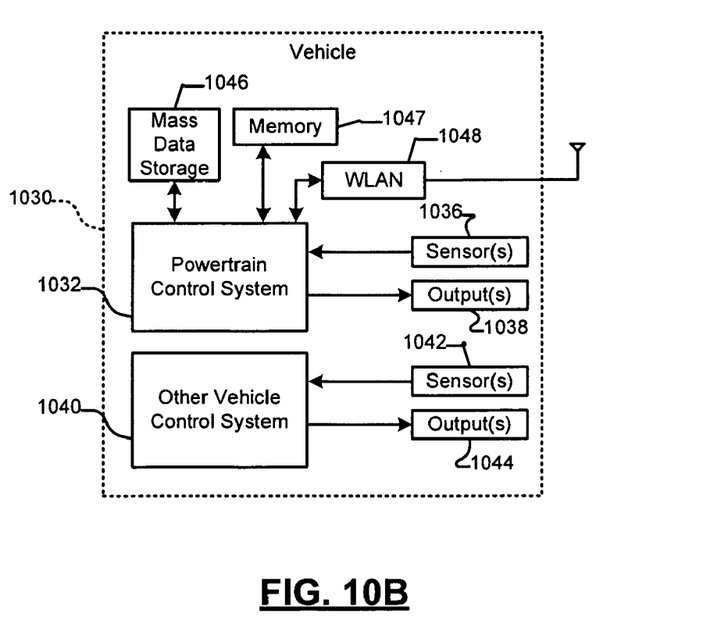

Referring now to FIG. 10B, such techniques may be utilized in a vehicle 1030. The vehicle 1030 includes a control system that may include mass data storage 1046, as well as a WLAN interface 1048. The mass data storage 1046 may support a powertrain control system 1032 that receives inputs from one or more sensors 1036 such as temperature sensors, pressure sensors, rotational sensors, airflow sensors and/or any other suitable sensors and/or that generates one or more output control signals 1038 such as engine operating parameters, transmission operating parameters, and/or other control signals.

Control system 1040 may likewise receive signals from input sensors 1042 and/or output control signals to one or more output devices 1044. In some implementations, control system 1040 may be part of an anti-lock braking system (ABS), a navigation system, a telematics system, a vehicle telematics system, a lane departure system, an adaptive cruise control system, a vehicle entertainment system such as a stereo, DVD, compact disc and the like.

Powertrain control system 1032 may communicate with mass data storage 1027 that stores data in a nonvolatile manner such as optical and/or magnetic storage devices. The mass storage device 1046 may be a mini HDD that includes one or more platters having a diameter that is smaller than approximately 1.8". Powertrain control system 1032 may be connected to memory 1047 such as RAM, ROM, low latency nonvolatile memory such as flash memory and/or other suitable electronic data storage. Powertrain control system 1032 also may support connections with a WLAN via a WLAN network interface 1048. The control system 1040 may also include mass data storage, memory and/or a WLAN interface (all not shown). In one exemplary embodiment, the WLAN network interface 1048 may implement bit-synchronization for multiple antenna receivers.

Figure 10C:
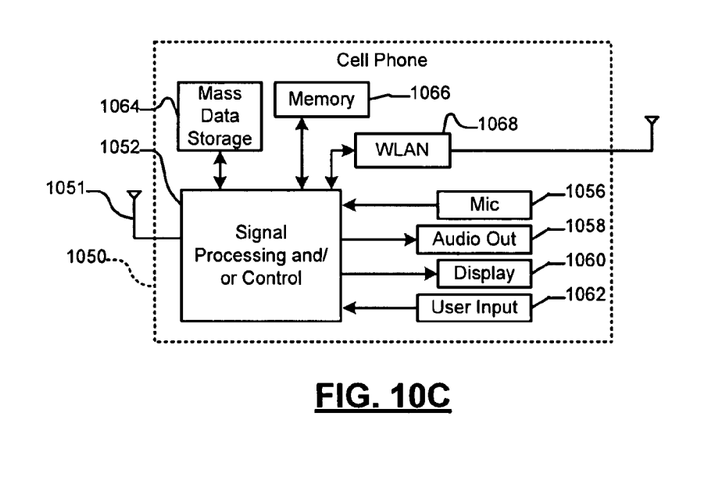

Referring now to FIG. 10C, such techniques may be used in a cellular phone 1050 that may include a cellular antenna 1051. The cellular phone 1050 may include either or both signal processing and/or control circuits, which are generally identified in FIG. 10C at 1052, a WLAN network interface 1068 and/or mass data storage 1064 of the cellular phone 1050. In some implementations, cellular phone 1050 includes a microphone 1056, an audio output 1058 such as a speaker and/or audio output jack, a display 1060 and/or an input device 1062 such as a keypad, pointing device, voice actuation and/or other input device. Signal processing and/or control circuits 1052 and/or other circuits (not shown) in cellular phone 1050 may process data, perform coding and/or encryption, perform calculations, format data and/or perform other cellular phone functions.

Cellular phone 1050 may communicate with mass data storage 1064 that stores data in a nonvolatile manner such as optical and/or magnetic storage devices for example hard disk drives HDD and/or DVDs. The HDD may be a mini HDD that includes one or more platters having a diameter that is smaller than approximately 1.8". Cellular phone 1050 may be connected to memory 1066 such as RAM, ROM, low latency nonvolatile memory such as flash memory and/or other suitable electronic data storage. Cellular phone 1050 also may support connections with a WLAN via a WLAN network interface 1068 may implement bit-synchronization for multiple antenna receivers for communication with automotive accessories such as in-vehicle displays or speakers or for personal accessories, such as a Bluetooth headset (not depicted).

Figure 10D:
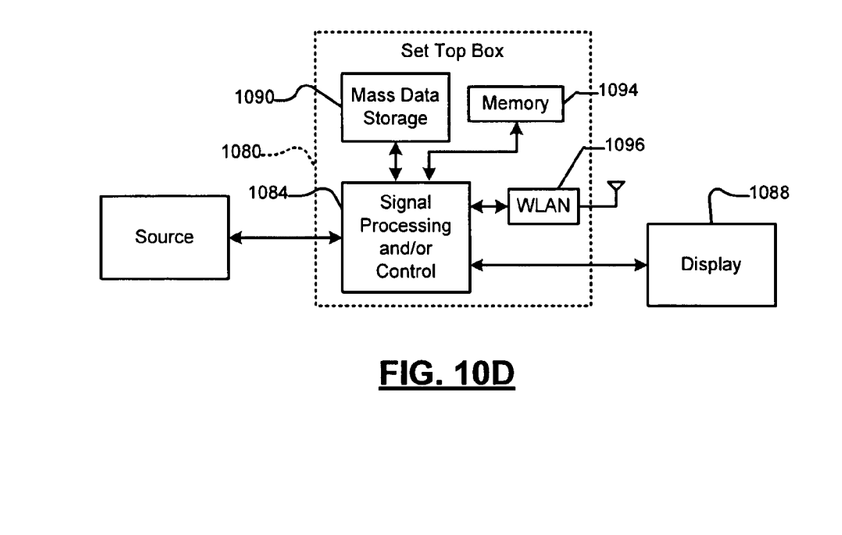

Referring now to FIG. 10D, such techniques may be utilized in a set top box 1080. The set top box 1080 may include either or both signal processing and/or control circuits, which are generally identified in FIG. 10D at 1084, a WLAN interface and/or mass data storage 1090 of the set top box 1080. Set top box 1080 receives signals from a source such as a broadband source and outputs standard and/or high definition audio/video signals suitable for a display 1088 such as a television and/or monitor and/or other video and/or audio output devices. Signal processing and/or control circuits 1084 and/or other circuits (not shown) of the set top box 1080 may process data, perform coding and/or encryption, perforin calculations, format data and/or perform any other set top box function.

Set top box 1080 may communicate with mass data storage 1090 that stores data in a nonvolatile manner and may use jitter measurement. Mass data storage 1090 may include optical and/or magnetic storage devices for example hard disk drives HDD and/or DVDs. The HDD may be a mini HDD that includes one or more platters having a diameter that is smaller than approximately 1.8". Set top box 1080 may be connected to memory 1094 such as RAM, ROM, low latency nonvolatile memory such as flash memory and/or other suitable electronic data storage. Set top box 1080 also may support connections with a WLAN via a WLAN network interface 1096. The WLAN network interface may implement bit-synchronization for multiple antenna receivers.

Figure 10E:
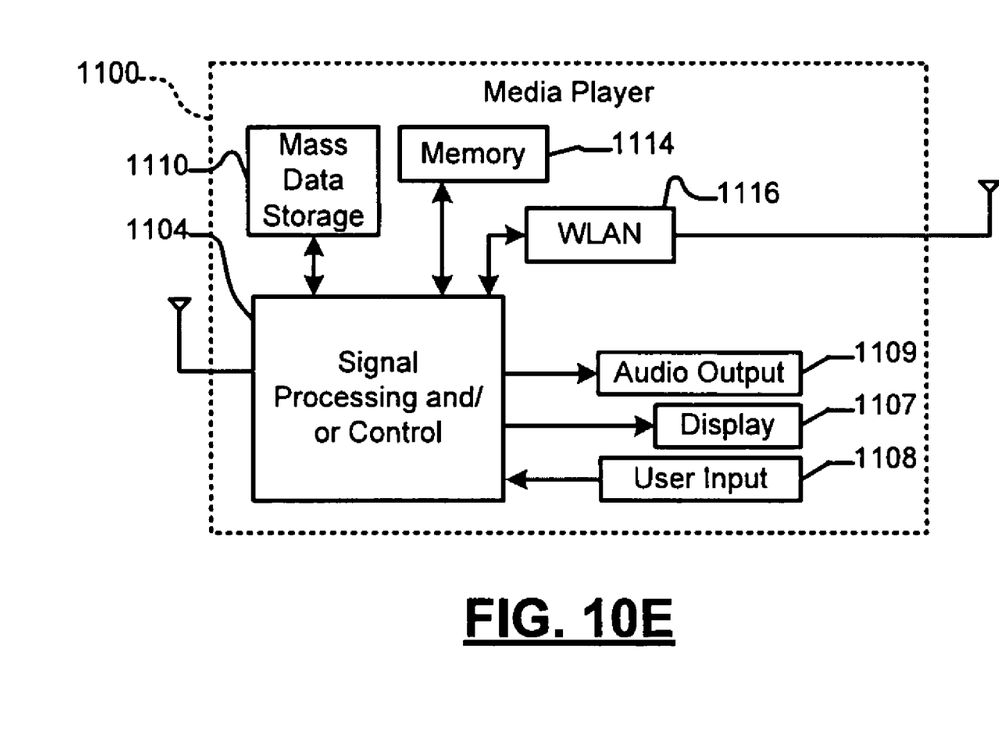

Referring now to FIG. 10E, such techniques may be used in a media player 1100. The media player 1100 may include either or both signal processing and/or control circuits, which are generally identified in FIG. 10E at 1104, a WLAN interface and/or mass data storage 1110 of the media player 1100. In some implementations, media player 1100 includes a display 1107 and/or a user input 1108 such as a keypad, touchpad and the like. In some implementations, media player 1100 may employ a graphical user interface (GUI) that typically employs menus, drop down menus, icons and/or a point-and-click interface via display 1107 and/or user input 1108. Media player 1100 further includes an audio output 1109 such as a speaker and/or audio output jack. Signal processing and/or control circuits 1104 and/or other circuits (not shown) of media player 1100 may process data, perform coding and/or encryption, perform calculations, format data and/or perform any other media player function.

Media player 1100 may communicate with mass data storage 1110 that stores data such as compressed audio and/or video content in a nonvolatile manner and may utilize jitter measurement. In some implementations, the compressed audio files include files that are compliant with MP3 format or other suitable compressed audio and/or video formats. The mass data storage may include optical and/or magnetic storage devices for example hard disk drives HDD and/or DVDs. The HDD may be a mini HDD that includes one or more platters having a diameter that is smaller than approximately 1.8". Media player 1100 may be connected to memory 1114 such as RAM, ROM, low latency nonvolatile memory such as flash memory and/or other suitable electronic data storage. Media player 1100 also may support connections with a WLAN via a WLAN network interface 1116. The WLAN network interface 1116 may implement bit-synchronization for multiple antenna receivers.

Figure 10F:
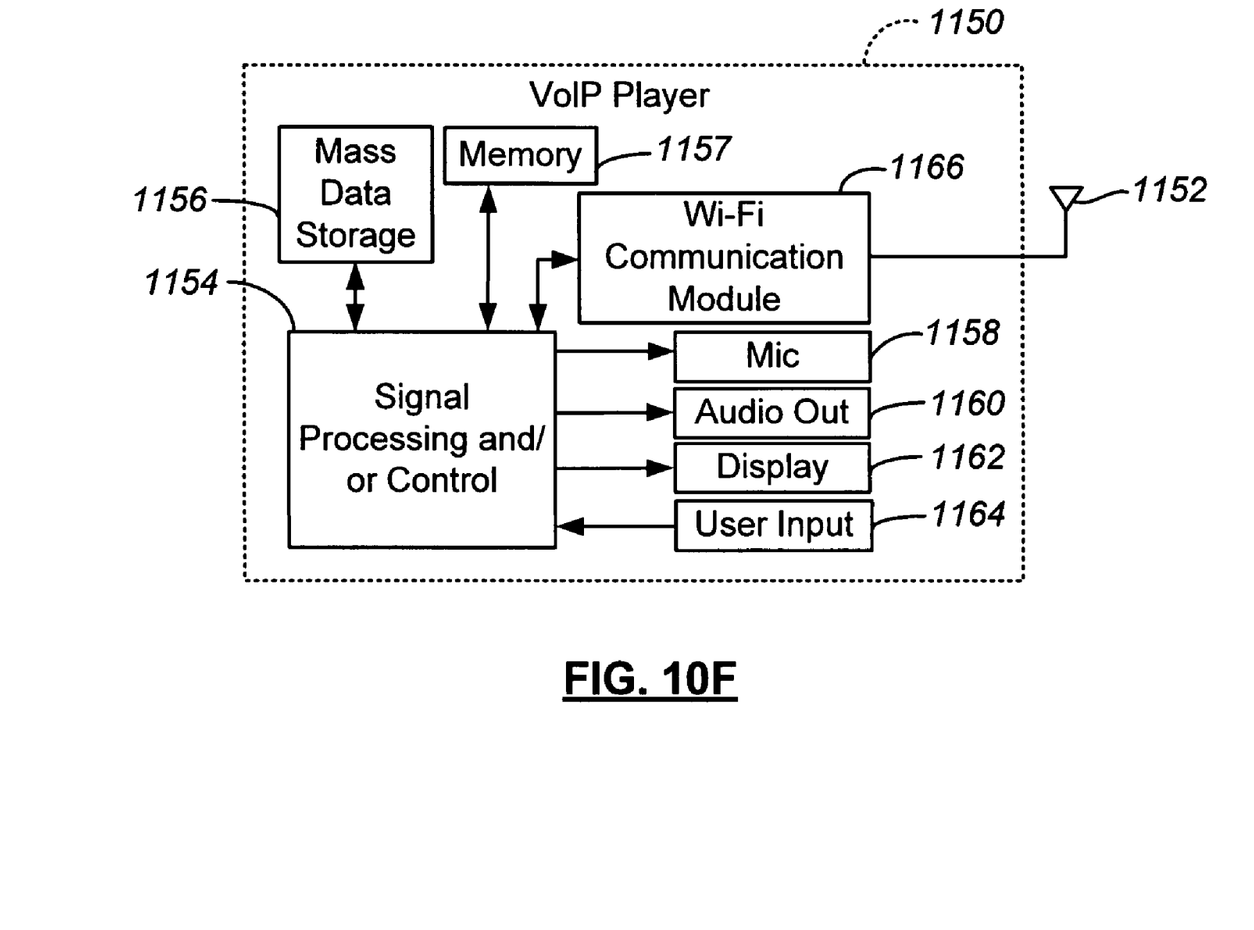

Referring to FIG. 10F, such techniques may be utilized in a Voice over Internet Protocol (VoIP) phone 1150 that may include an antenna 1152. The VoIP phone 1150 may include either or both signal processing and/or control circuits, which are generally identified in FIG. 10F at 1154, a wireless interface and/or mass data storage of the VoIP phone 1150. In some implementations, VoIP phone 1150 includes, in part, a microphone 1158, an audio output 1160 such as a speaker and/or audio output jack, a display monitor 1162, an input device 1164 such as a keypad, pointing device, voice actuation and/or other input devices, and a Wireless Fidelity (WiFi) communication module 1166. Signal processing and/or control circuits 1154 and/or other circuits (not shown) in VoIP phone 1150 may process data, perform coding and/or encryption, perform calculations, format data and/or perform other VoIP phone functions.

VoIP phone 1150 may communicate with mass data storage 1156 that stores data in a nonvolatile manner such as optical and/or magnetic storage devices, for example hard disk drives HDD and/or DVDs. The HDD may be a mini HDD that includes one or more platters having a diameter that is smaller than approximately 1.8". VoIP phone 1150 may be connected to memory 1157, which may be a RAM, ROM, low latency nonvolatile memory such as flash memory and/or other suitable electronic data storage. VoIP phone 1150 is configured to establish communications link with a VoIP network (not shown) via WiFi communication module 1166. The WiFi communication module 1166 may implement bit-synchronization for multiple antenna receivers when communicating data via the WiFi communication module 1166 or via the audio output 1160 in communication with an accessory, such as a Bluetooth headset (not depicted).

The various blocks, operations, and techniques described above may be implemented in hardware, firmware, software, or any combination of hardware, firmware, and/or software. When implemented in software, the software may be stored in any computer readable memory such as on a magnetic disk, an optical disk, or other storage medium, in a RAM or ROM or flash memory of a computer, processor, hard disk drive, optical disk drive, tape drive, etc. Likewise, the software may be delivered to a user or a system via any known or desired delivery method including, for example, on a computer readable disk or other transportable computer storage mechanism or via communication media. Communication media typically embodies computer readable instructions, data structures, program modules or other data in a modulated data signal such as a carrier wave or other transport mechanism.

The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared and other wireless media. Thus, the software may be delivered to a user or a system via a communication channel such as a telephone line, a DSL line, a cable television line, a wireless communication channel, the Internet, etc. (which are viewed as being the same as or interchangeable with providing such software via a transportable storage medium). When implemented in hardware, the hardware may comprise one or more of discrete components, an integrated circuit, an application-specific integrated circuit (ASIC), etc.

While the present invention has been described with reference to specific examples, which are intended to be illustrative only and not to be limiting of the invention, it will be apparent to those of ordinary skill in the art that changes, additions or deletions in addition to those explicitly described above may be made to the disclosed embodiments without departing from the spirit and scope of the invention.

We claim:

1. A method of performing bit synchronization in a spread spectrum receiver having a plurality of receive paths, each receive path including a correlator and a magnitude calculator, comprising:
    combining outputs from the respective magnitude calculators of two or more of the plurality of receive paths to form a combined signal;
    dividing the combined signal into a plurality of samples at a sequence of intervals over a symbol time;
    selecting a sample from the plurality of samples with highest magnitude value for the symbol time; and
    providing a rake receiver system with a symbol-synchronization signal that corresponds to an interval of the sequence of intervals containing the sample with the highest magnitude value.

2. The method of claim 1, wherein combining the outputs from the respective magnitude calculators comprises summing each output from the magnitude calculator of each receive path.

3. The method of claim 1, wherein combining the output from the respective magnitude calculators comprises summing an output from the magnitude calculator of a receive path if such output has a magnitude value above a threshold level.

4. The method of claim 1, wherein combining the outputs from the respective magnitude calculators comprises setting the combined signal to zero when the combined signal is below a threshold.

5. The method of claim 1, wherein selecting the sample with the highest magnitude value comprises adding an adjacent sample from at least one adjacent interval to a current interval when selecting the sample with the highest magnitude value.

6. The method of claim 5, wherein adding the adjacent sample comprises adding an equal number of samples from intervals adjacent to and on either side of the current interval.

7. A receiver comprising:
    a plurality of front end segments, each of the plurality of front end segments including an antenna, a radio frequency section, and a correlator with a correlator output to produce an output signal;
    a plurality of magnitude calculators, each magnitude calculator coupled to one of the plurality of front end segments;
    a summing circuit with an plurality of inputs and an output, each of the plurality of inputs coupled to a corresponding one of the plurality of magnitude calculators and the output producing a sum output of signals appearing at the plurality of inputs;
    a timing circuit with a plurality of timing outputs, each timing output activated once during a frame time of a received signal;
    a switching circuit coupled to the timing circuit;
    a register with a plurality of slots, each slot coupled to the output of the summing circuit through the switching circuit, so that a current value of the sum output is distributed, in sequence, to each of the plurality of slots during the frame time of the received signal; and
    a comparator coupled to the register to select a slot containing a maximum-value and to output a bit synchronization signal at a time corresponding to a relative position of the selected slot.

8. The receiver of claim 7, wherein the switching circuit comprises a series of multiplexers that couple the sum output to its respective one of the plurality of slots when enabled and a zero value to its respective one of the plurality of slots when not enabled.

9. The receiver of claim 7, wherein the timing circuit runs at x times a frame rate and has x timing outputs, wherein x is an integer greater than one.

10. The receiver of claim 7, wherein x is 22.

11. The receiver of claim 7, wherein the receiver is compliant with the 802.11(b) protocol.

12. The receiver of the claim 7, further comprising a rake receiver to receive the bit synchronization signal from the comparator.

13. The receiver of claim 7, further comprising a threshold switch coupled between each of the plurality of magnitude calculators and the corresponding input of the summing circuit, each threshold switch passing the output signal from a corresponding correlator when the output signal is above a threshold level.

14. The receiver of claim 7, further comprising a threshold switch coupled between the output of the summing circuit and the register, the threshold switch passing the sum output when the sum output is above a threshold level.

15. The receiver of claim 7, wherein the comparator adds a register slot value of a current slot to a slot value of one or more adjacent registers to determine the register slot value when selecting the slot containing the maximum-value.

16. The receiver of claim 15, wherein the comparator adds the register slot value from x adjacent registers above the current slot and x adjacent registers below the current slot when selecting the slot containing the maximum-value, and wherein x is an integer greater than one.

17. The receiver of claim 16, wherein x=7.

18. A receiver comprising:
    a plurality of front end segments, each of the plurality of front end segments including an antenna, a radio frequency section, and a correlator with a correlator output to produce an output signal;
    a plurality of magnitude calculators, each magnitude calculator coupled to one of the plurality of front end segments;
    a summing circuit with an input and an output, the input coupled to each of the plurality of magnitude calculators and the output producing a sum output of signals appearing at the input;
    a threshold switch coupled between each of the plurality of magnitude calculators and the input of the summing circuit, each threshold switch passing the output signal when the output signal is above a threshold level;
a timing circuit with a plurality of timing outputs, each timing output activated once during a frame time of a received signal;
a switching circuit coupled to the timing circuit;
a register with a plurality of slots, each slot coupled to the output of the summing circuit through the switching circuit, so that a current value of the sum output is distributed, in sequence, to each of the plurality of slots during the frame time of the received signal;
a comparator with window calculator coupled to the register to combine values from slots adjacent to a slot of interest and to select a designated slot containing a maximum-value using the combined values and to output a bit synchronization signal at a time corresponding to a relative position of the selected slot; and
a rake receiver coupled to the comparator to receive the bit synchronization signal.

19. The receiver of claim 18, wherein each magnitude calculator comprises a real signal magnitude calculator and an imaginary signal magnitude calculator and an adder that adds the larger of the real and the imaginary signal magnitudes with a fraction of the smaller of the real and the imaginary signal magnitudes.

20. The receiver of claim 18, wherein the fraction is 13/32.

21. A receiver comprising:
a radio frequency front end that receives a signal at a plurality of antennas and produces a plurality of output signals, one for each of the plurality of antennas;
a plurality of magnitude calculators, that receive a respective one of the plurality of output signals and calculate a respective instantaneous signal strength metric;
a summing circuit with an input and an output, the input coupled to each of the plurality of magnitude calculators and the output providing a sum output of signals appearing at the input;
a filter circuit coupled to the output of the summing circuit, the filter means passing the sum output when the sum output is above a threshold level;
a timing circuit with a plurality of timing outputs, each timing output activated once during a frame time of a received signal;
a switching circuit coupled to the timing circuit responsive to each timing output for selectively coupling a switching circuit input to one switching circuit output;
a storage circuit with a plurality of slots, each slot coupled to the output of the summing circuit through the switching circuit, so that a current value of the sum output is distributed, in sequence, to each of the plurality of slots during the frame time of the received signal;
a comparison circuit coupled to the storage means to identify a slot containing a maximum-value and to output a bit synchronization signal at a time corresponding to a relative position of the identified slot; and
a rake receiver coupled to the comparison means to receive the bit synchronization signal from the comparison means.

22. The receiver of claim 21, wherein each of the plurality of magnitude calculators applies a noise correction factor to a lesser of a real and an imaginary component when calculating the instantaneous signal strength metric.

23. A method of performing bit synchronization in a spread spectrum receiver having a plurality of receive paths, each receive path including a correlator and a magnitude calculator, comprising:
adding outputs from the magnitude calculators of the plurality of receive paths to form a combined signal;
setting the combined signal to zero when the combined signal is below a threshold value;
dividing the combined signal into a plurality of samples at a sequence of intervals over a frame time;
selecting a sample from the plurality of samples with highest magnitude value for the frame time;
providing a rake receiver with a bit-synchronization signal that corresponds to an interval of the sequence of intervals containing the sample with the highest magnitude value.

24. The method of claim 23, further comprising:
adding an adjacent sample from at least one adjacent interval to a current interval to select the sample with the highest magnitude value.

25. The method of claim 23, further comprising:
calculating an output of each magnitude calculator as the greater absolute value of a real and an imaginary components of an output of the corresponding correlator added to 13/32 of the lesser of an absolute magnitude of the real and the imaginary components of the output of the corresponding correlator.

* * * * *